(12) United States Patent
Pellegrino

(10) Patent No.: US 7,578,066 B1
(45) Date of Patent: Aug. 25, 2009

(54) DIRECT MOUNT HUB ADAPTER

(76) Inventor: Dean Pellegrino, 243 Lynn Oaks Ave., Thousand Oaks, CA (US) 91320

( * ) Notice: Subject to any disclaimer, the term of this patent is extended or adjusted under 35 U.S.C. 154(b) by 19 days.

(21) Appl. No.: 11/985,377

(22) Filed: Nov. 14, 2007

(51) Int. Cl.
*G01B 5/24* (2006.01)
*G01B 7/30* (2006.01)
*G01B 11/26* (2006.01)
*G01B 13/18* (2006.01)

(52) U.S. Cl. ............... 33/203.18; 33/203; 248/220.21; 248/229.2

(58) Field of Classification Search ............. 33/203.18, 33/203; 73/756, 146; 81/484
See application file for complete search history.

(56) References Cited

U.S. PATENT DOCUMENTS

| | | | | |
|---|---|---|---|---|
| 2,594,407 A | * | 4/1952 | Earnest | 70/169 |
| 2,972,189 A | * | 2/1961 | Holub | 33/288 |
| 4,083,606 A | * | 4/1978 | Scruggs | 301/37.21 |
| 4,274,679 A | * | 6/1981 | Brinson et al. | 301/37.21 |
| 4,759,133 A | * | 7/1988 | Macpherson | 33/288 |
| 6,507,988 B1 | * | 1/2003 | Riviere | 29/407.01 |
| 2002/0189114 A1 | * | 12/2002 | Voeller et al. | 33/203.18 |

\* cited by examiner

*Primary Examiner*—Amy J. Sterling
(74) *Attorney, Agent, or Firm*—Sandy Lipkin

(57) ABSTRACT

An adapter that eliminates that need for a clamp during the alignment of vehicle wheels. The adapter is particularly useful in tires that have lipless wheels, rim-guard tires, stiffer sidewalls and larger diameter wheels, which have caused problems when using traditional clamps. The adapter is cylindrical in shape and has a first end and a second end. The first end is attached to the alignment instrument. The second end is attached to a hole located in the center of a plate that is attached to the vehicle hub assembly through two or more lug bolts. The plate is positioned substantially parallel to the vehicle wheel and the alignment head is then attached directly to the hub through the clampless adapter, providing for improved accuracy in alignment measurements and corrections.

1 Claim, 4 Drawing Sheets

DIRECT MOUNT HUB ADAPTER

BACKGROUND OF THE INVENTION

1. Field of the Invention

The field of this invention relates generally to wheel alignment tools and specifically toward an adapter that allows for accurate alignment of wheels without the direct clamping of the alignment head to the wheel.

2. Description of the Prior Art

The subject matter of the present invention is an improved adapter for wheel alignment that is particularly helpful with new generation tires that contain newer technology, including lipless wheels, rim-guard tires, stiffer sidewalls and larger diameter wheels.

Proper alignment of vehicle wheels is necessary for smooth, vibration-free handling of the vehicle and also so the vehicle doesn't have a tendency to drift one way or another on the road. Also, proper alignment of vehicle wheels is a necessary component for even tire wear. To accomplish vehicular alignment, it is necessary to establish the position of certain measurements in conjunction with each vehicle wheel. These measurements are camber, caster, steering axis, inclination and toe.

Typical present day alignment instruments utilize placing a separate vehicular instrument (sensor) on each vehicular wheel. Each instrument has an emitter and a receiver. The emitter emits a signal which is transmitted to a receiver of another alignment instrument. The receiver will convert the signal into a value which is indicative of the corresponding alignment angle of the vehicle. This information can be used by the mechanic to adjust the aforementioned measurements in order to achieve the correct and necessary alignment for a vehicular wheel.

Alignment instruments that are in present day usage are normally mounted onto the entire rim of the vehicular wheel. Tire rims sometimes may be damaged and may be slightly out of round or slightly inclined relative to the wheel hub. Such damage frequently occurs by the tire and the rim coming into hard contact with an uneven roadway, such as a chuckhole or a curb. Using of the alignment instrument in conjunction with the tire rim does not achieve an accurate alignment because the rim itself is not correctly aligned relative to the wheel hub on which it is mounted.

Additionally, a great many tire rims are designed to be ornate and have a highly polished chrome surface. Mounting of an alignment instrument on such a vehicular rim frequently causes scratching or denting of the rim. Vehicle owners of such rims take great pride in the appearance of these rims. When a vehicle owner has left his vehicle with a mechanic or tire shop, and when he or she comes back to pick up his or her vehicle finds scratches or dents on the rims, almost invariably the vehicle owner will insist upon replacement, not repair, of these rims. Replacement of each rim can run several hundred dollars in cost to the mechanic or tire shop.

Additionally, most tire rims, in years past, have been manufactured with an annular raised lip located directly adjacent and peripheral edge of the tire rim. The alignment instruments have been constructed to utilize the annular raised lip to mount the instrument onto the tire rim. Currently, some tire rims no longer are being manufactured with this annular raised lip. Therefore, there is no known way to mount the alignment instrument onto the tire rim. The result is the mechanic doing the alignment just does a lot of "fudging" or "speculating" and guesses at what he or she hopes will be a correct alignment. The result is the alignment is of poor quality and proper handling of the vehicle is not obtained. Uneven tire wear is also obtained.

SUMMARY OF THE INVENTION

The basic embodiment of the present invention teaches a clampless adapter that directly mounts an alignment instrument to the hub of a vehicle wheel through a mounting plate comprising a cylindrical body having a first end and a second end, the first end being attachable to the alignment instrument and the second end being attachable to the plate, the plate having a center hole for attachment of the second end thereto and the plate being connected in a position substantially parallel to the vehicle wheel, the center hole being aligned with the hub of the vehicle wheel.

The above embodiment can be further modified by defining that the adapter further includes a means for securing the cylindrical body in place after being attached to the alignment head and the plate.

A second embodiment of the instant invention teaches a mounting system adapted to mount an alignment instrument on a wheel hub assembly which is fixedly mounted on a wheel hub assembly by a series of spaced apart lug bolts that are arranged in a specific pattern that protrude outward from the vehicular wheel, the mounting system comprising: a mounting plate, the mounting plate having a center hole and at least five in number of elongated holes located in a specific spaced apart arrangement, each elongated hole to be able to connect with a lug bolt, there being at least two in number of the lug bolts each connecting with an elongated hole, the plate being connected to the alignment instrument through an adapter comprising a cylindrical body having a first end and a second end, the first end being attachable to the alignment instrument and the second end being attachable to the plate, the plate having a center hole for attachment of the second end thereto and the plate being connected in a position substantially parallel to the vehicle wheel, the center hole being aligned with the hub of the vehicle wheel.

The above embodiment can be further modified by defining that the adapter has a means for securing the cylindrical body in place after being attached to the alignment head and the plate.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF A PREFERRED EMBODIMENT

Figure 1:
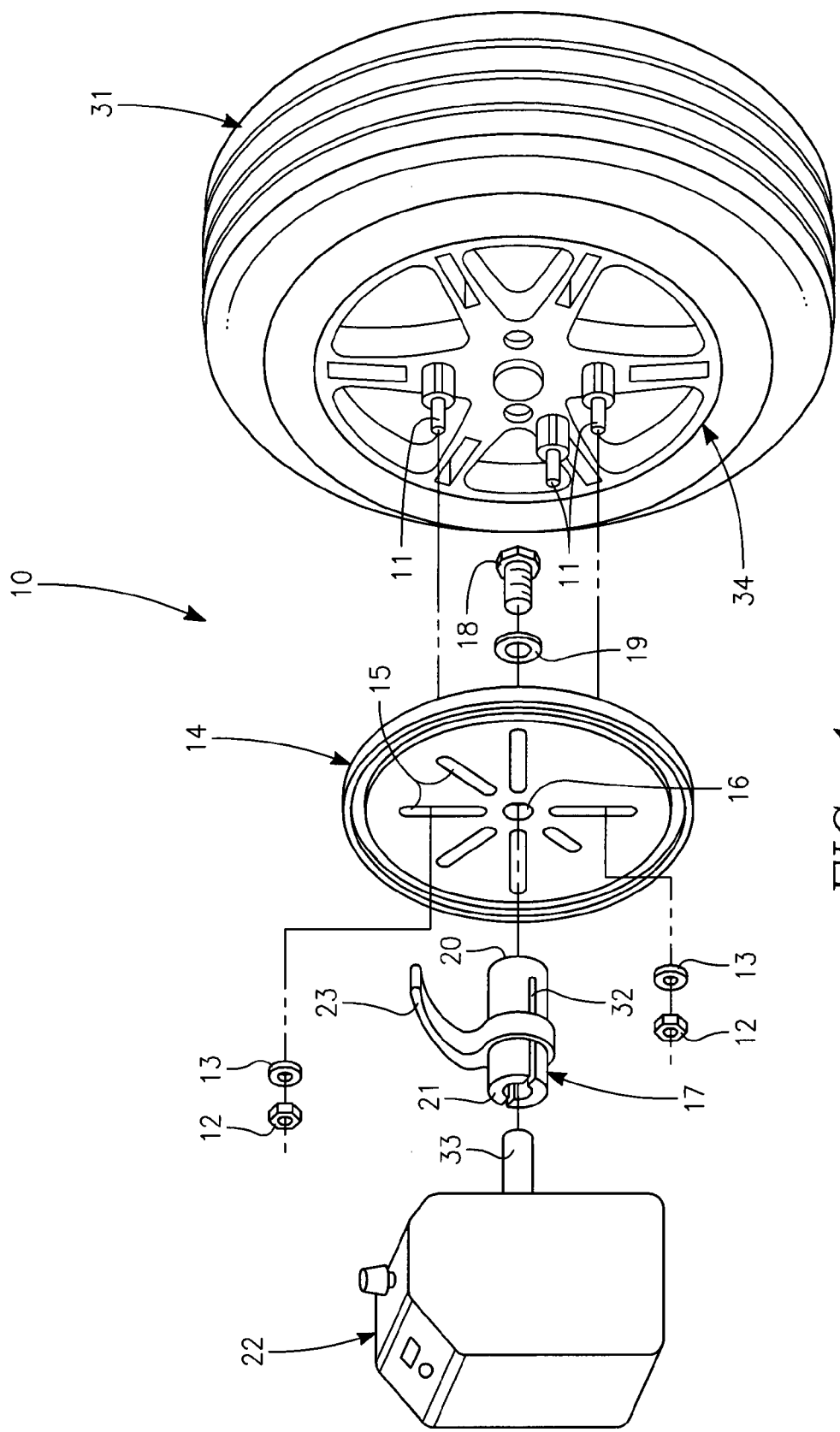
FIG. 1 is an exploded view of the hub adapter of the instant invention in use with the entire alignment system.

Turning to the drawings, the preferred embodiment is illustrated and described by reference characters that denote similar elements throughout the several views of the instant invention.

Because many new tire and wheel packages leave no room to mount traditional clamps so that even if you can get them to stay on, they often produce an inaccurate alignment. Furthermore, moving around the clamps to provide an accurate fit can damage the wheel. The present design provides alignment not through clamping to the wheel, but through clamping to the hub. Through the alignment process, it is really setting the angle of the hub that is achieved, rather than the wheel. The instant invention measures from the source of the issue, which is the hub, leading to greater accuracy.

The adapter of the instant invention works in cooperation with a system that includes an aluminum plate that is the subject of U.S. Pat. No. 7,117,603 to the current inventor. The plate is attached to the rim of the wheel by replacing three lug nuts with mounting adapters and then bolting on the plate. This plate has universal applicability and can be consistently attached to any brand of alignment head.

Because the plate mounts to the hub through the studs, the accuracy of the alignments is improved. Furthermore, there is no chance of scratching or gouging an expensive custom wheel. It does not matter what style or size of wheel is being used. The tool provides the user with consistent clamping area so clamping will not vary. The system comes with eight sets of steel adapters to replace the lug nuts during the alignment and to which one attaches the aluminum plate.

Once the plate is attached to the hub of the wheel through the lug nuts, the plate itself is then directly attached to the alignment head through the direct mount clampless hub adapter which is the subject of the instant invention.

The direct mount clampless hub adapter is centered and easily attaches to the aluminum plate. The expandable sleeve allows for any manufacturer's alignment heads to directly mount on the plate. Because the hub is centered, and because the self-centering plates are mounted directly to the hub of the vehicle, a significant portion of run-out is eliminated, with the overall effect being a significant reduction in run-out. By attaching directly to the vehicle's hub, the device drastically reduces inaccuracies and clamp attachment difficulties of both the quick clamp and traditional alignment systems.

In FIG. 1 the entire system 10 is depicted in an exploded view. The tire 31 has a series of lug nuts 11 that connect to bolts 12 and washers 13. The lug bolts 12 are removed from the lug nuts 11 and the lug nuts 11 then are situated through a corresponding elongated hole 15 found in the mounting plate 14. Once situated through an elongated hole 15, the lug nuts 11 are fastened to the mounting plate 14 with a corresponding lug bolt 12 and washer 13.

The mounting plate 14 has a center hole 16. This center hole 16 is where the direct hub mount adapter 17 of the instant invention connects to the mounting plate 14. The first end 20 of the adapter 17 is secured the mounting plate 14 through a nut 18 and washer 19. The second end 21 of the adapter 17 is then connected to the alignment head 22.

Figure 2:
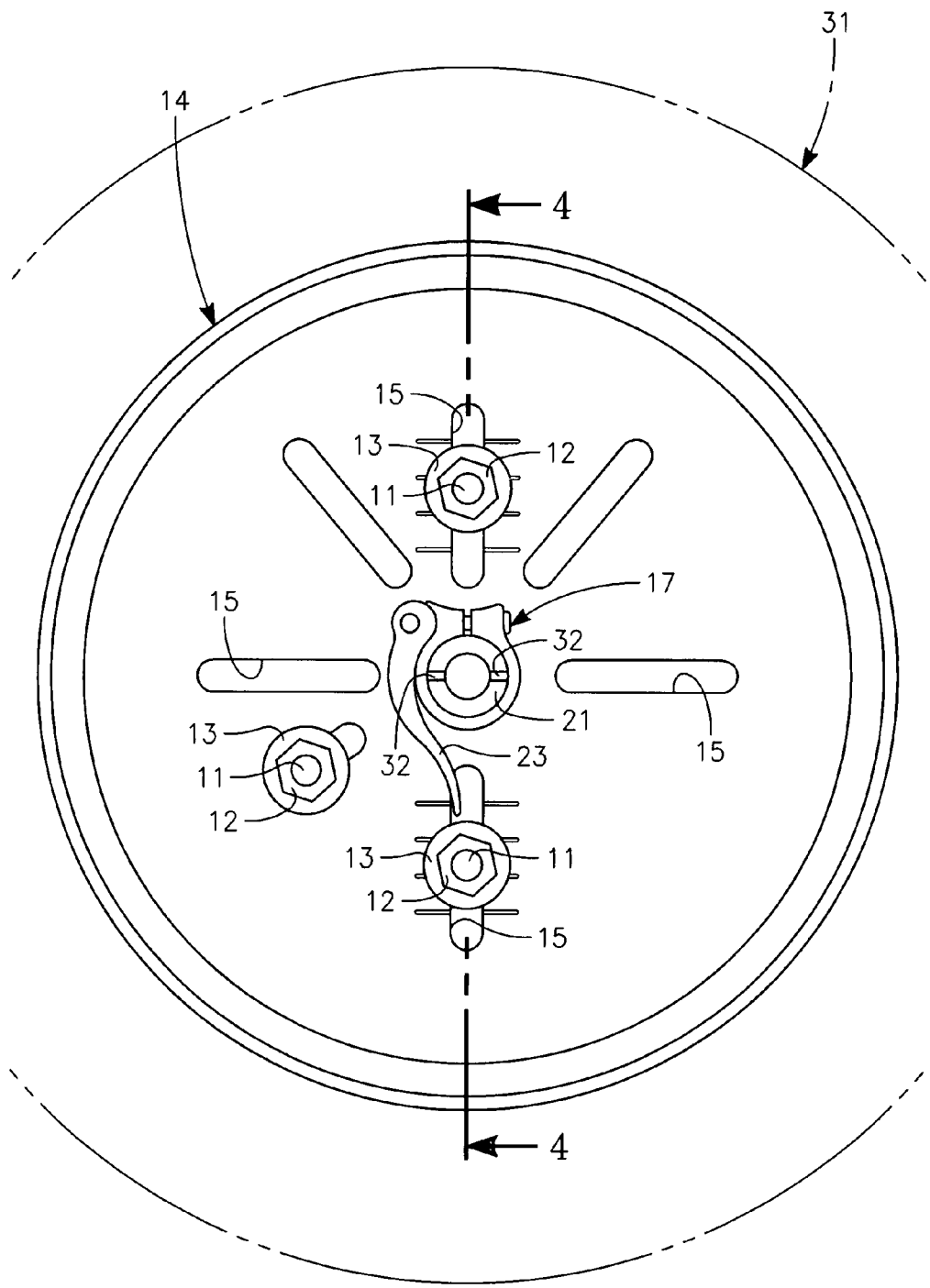
FIG. 2 is a front view of the adapter as it attaches to the mounting plate and prior to be attached to the alignment head.
Figure 3:
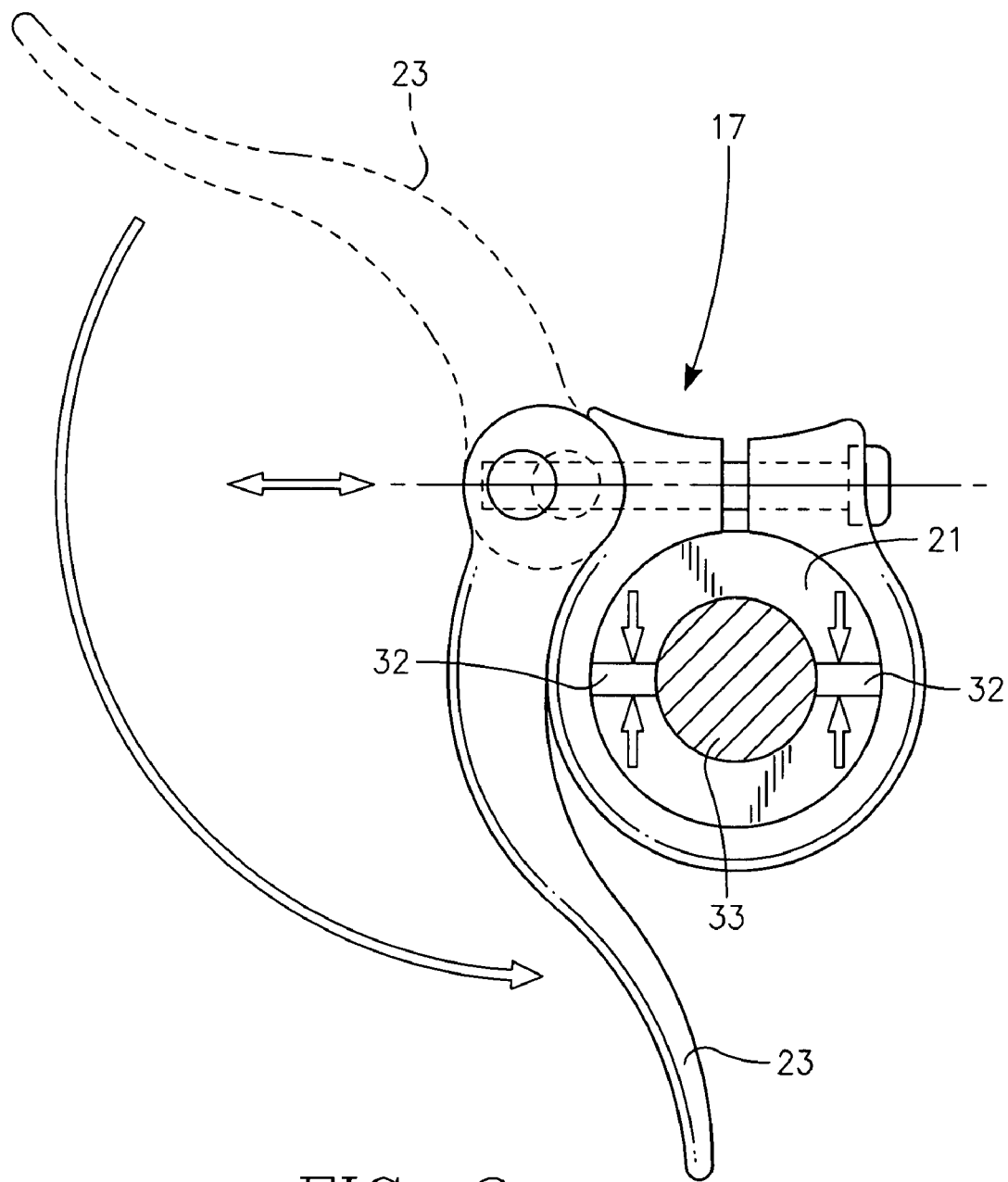
FIG. 3 is a side close-up view of the clampless direct mount hub adapter showing both the relaxed position (in phantom) and the tightened position.

As is seen in FIG. 2, the mounting plate 14 is then aligned parallel to the rim of the wheel 11. FIG. 3 shows the adapter close up and in detail. Prior to placing the second end 21 of the adapter on the alignment head 22, there is a lever 23 that is held in a first relaxed position and a second tightened position. Once the adapter is connected to both the mounting plate 14 and the alignment head 22, the lever 23 is moved top the second tightened position as illustrated in FIG. 3

Figure 4:
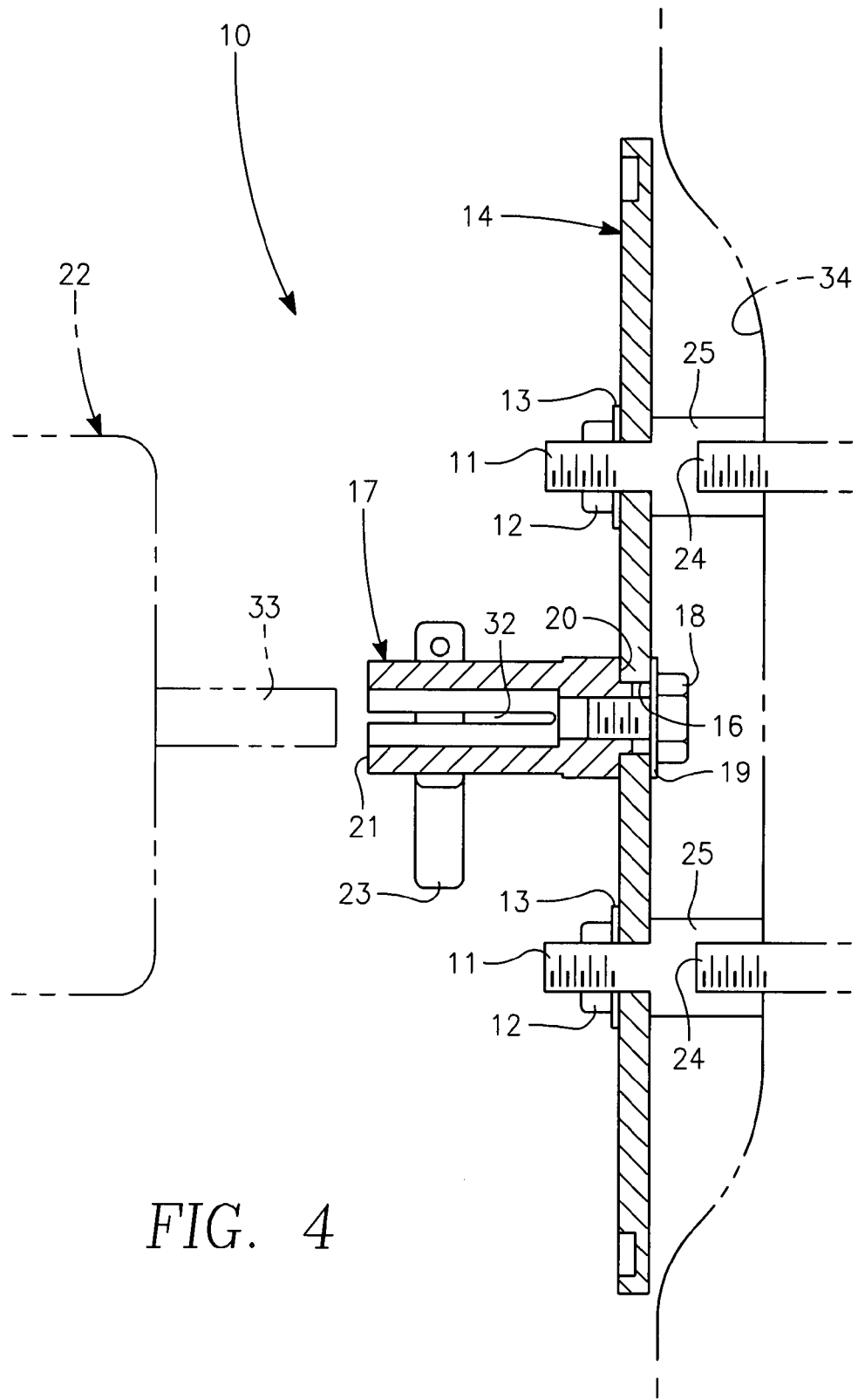
FIG. 4 is taken along line 4-4 in FIG. 2

The side view of the invention is illustrated in FIG. 4. The rim 34 of the tire 11 has mounted thereon on or more lug nuts 11 that have a lug stud base 24 and a spacer 25. The lug nuts 11 are placed inside the elongated holes 15 seen more clearly in FIGS. 1-2 and are secured thereon through a bolt 12 and washer 13. In the center hold 16 of the plate, the center nut 18 is placed and secured with a washer 19. The adapter 17 is composed of a shaft 33 with an interior slit 32, which is then attached to the center nut 19. The lever 23 of the adapter 17 is in its relaxed state, illustrated in FIG. 3 until the test equipment 22 is then attached to the second end 21 of the adapter 17, at which point the lever 23 secures the system together by being placed in the tightened position, as illustrated in FIG. 3.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A hub adapter system for the alignment of a vehicle wheel for alignment of said vehicle wheel without removing said vehicle wheel from the vehicle comprising
   an alignment instrument;
   a mounting plate having a center hole;
   a vehicle wheel having a hub wherein said alignment instrument mounts to said hub of said vehicle wheel through said center hole in said mounting plate through an adapter, and a fastener said adapter further comprising:
   a cylindrical body having a first end and a second end wherein said first end is attached to said alignment instrument and said second end is attached to said mounting plate, by the fastener with said mounting plate being oriented in a position substantially parallel to said vehicle wheel, said center hole being aligned with said hub of said vehicle wheel.

* * * * *